US011363146B2

United States Patent
Rico Ródenas

(10) Patent No.: US 11,363,146 B2
(45) Date of Patent: Jun. 14, 2022

(54) UNSUPERVISED METHOD AND SYSTEM TO AUTOMATICALLY TRAIN A CHATBOT USING DOMAIN CONVERSATIONS

(71) Applicant: Sigma Technologies, S.L., Madrid (ES)

(72) Inventor: Jorge Rico Ródenas, Madrid (ES)

(73) Assignee: Sigma Technologies, S.L., Madrid (ES)

( * ) Notice: Subject to any disclaimer, the term of this patent is extended or adjusted under 35 U.S.C. 154(b) by 73 days.

(21) Appl. No.: 16/613,020

(22) PCT Filed: Oct. 16, 2019

(86) PCT No.: PCT/ES2019/070703
§ 371 (c)(1),
(2) Date: Nov. 12, 2019

(87) PCT Pub. No.: WO2021/074459
PCT Pub. Date: Apr. 22, 2021

(65) Prior Publication Data
US 2021/0360109 A1    Nov. 18, 2021

(51) Int. Cl.
*G06F 15/00* (2006.01)
*G10L 15/00* (2013.01)
(Continued)

(52) U.S. Cl.
CPC .......... *H04M 3/5235* (2013.01); *G06F 40/35* (2020.01); *H04M 3/5175* (2013.01); *H04M 3/5191* (2013.01); *H04M 2201/40* (2013.01)

(58) Field of Classification Search
CPC ... G06F 40/35; H04M 3/5235; H04M 3/5175; H04M 3/5191; H04M 2201/40
(Continued)

(56) References Cited

U.S. PATENT DOCUMENTS 9,848,082 B1 *  12/2017  Lillard ................ H04M 3/5231
10,366,336 B2 *  7/2019  Tur ........................ G06N 5/022
(Continued)

OTHER PUBLICATIONS

J. Brenier "Amplifying User Intelligence with Chatbot Feedback Loops", URL:https ://chatbotsmagazine.com/amplifying-user-intelligence-with-chatbot-feedback-loops (Dec. 12, 2018).
(Continued)

*Primary Examiner* — Khai N. Nguyen

(57) ABSTRACT

The present disclosure relates to techniques for automatically training a chatbot using utterances not understood by the chatbot itself and thus improve its understanding in a fast, effective and unsupervised way. This disclosure implements techniques to update known intents, to create new ones, and to modify the dialog manager so that new responses can be provided. Known intents can be updated with the chatbot's non-understood messages in three different ways: 1) when the user is asked to reformulate his request due to the chatbot not understanding the user, and the confidence of the new intent is greater than a confidence threshold, and the new detected intent is the same as the previous intent; 2) when the user accepts an intent suggestion from the chatbot; and 3) when the agent accepts a response suggestion from the chatbot. New intents, on the other hand, can be automatically created and automatically associated with real answers provided by human agents. These two strategies used simultaneously allow unsupervised training of a dialog system. The benefits of this approach are twofold: 1) there is no need for human intervention to improve the chatbot (unsupervised training), and 2) the new learning introduced in the models comes from real data, not from utterances produced artificially by a human.

23 Claims, 4 Drawing Sheets

(51) Int. Cl.
*G10L 17/00* (2013.01)
*G10L 15/18* (2013.01)
*G10L 15/28* (2013.01)
*H04M 3/523* (2006.01)
*G06F 40/35* (2020.01)
*H04M 3/51* (2006.01)

(58) Field of Classification Search
USPC .................................. 704/9, 246, 255, 257
See application file for complete search history.

(56) References Cited

U.S. PATENT DOCUMENTS

| | | | | |
|---|---|---|---|---|
| 10,565,537 | B1* | 2/2020 | Askew | G06N 5/003 |
| 10,733,558 | B2* | 8/2020 | Askew | G06F 3/0481 |
| 10,866,975 | B2* | 12/2020 | Khaitan | G06F 16/3325 |
| 2014/0036023 | A1* | 2/2014 | Croen | H04N 7/147 |
| | | | | 348/14.01 |
| 2015/0339627 | A1* | 11/2015 | Brunner | G06Q 10/10 |
| | | | | 705/345 |
| 2016/0071517 | A1* | 3/2016 | Beaver | G10L 15/22 |
| | | | | 704/9 |
| 2020/0117858 | A1* | 4/2020 | Freeman | G06F 40/35 |
| 2020/0184390 | A1* | 6/2020 | Askew | G06N 20/20 |
| 2020/0342032 | A1* | 10/2020 | Subramaniam | G10L 15/063 |
| 2021/0294792 | A1* | 9/2021 | Sanshwe | G06F 16/2379 |

OTHER PUBLICATIONS

A. Zahra et al "Resilient Chatbots Repair Strategy Preferences for Conversational Breakdowns", Human Factors In Computing Systems, ACM (May 2, 2019).

B. Hancock et al "Learning from Dialogue After Deployment: Feed Yourself, Chatbot!", ARXIV.ORG, Cornell University Library (Jan. 16, 2019).

International Search Report and Written Opinion of the International Searching Authority, issued in PCT/ES2019/070703, dated Jun. 29, 2020; ISA/EP.

* cited by examiner

UNSUPERVISED METHOD AND SYSTEM TO AUTOMATICALLY TRAIN A CHATBOT USING DOMAIN CONVERSATIONS

This application claims the priority of International Application Serial No. PCT/ES2019/070703, filed on Oct. 16, 2019. The entire disclosure of which is incorporated by reference herein.

FIELD

The present disclosure relates to techniques to automatically train a chatbot using utterances not understood by the chatbot itself and thus improve its understanding in a fast, effective and unsupervised way.

BACKGROUND

Current state-of-the-art dialogue systems based on machine learning methods require a lot of manually labelled information to work with a high accuracy rate. This human resource makes the development of these systems slow and expensive. Many small projects are not viable for this reason.

Work has been carried out with a focus on minimizing this human effort by introducing diverse supervised or semi-supervised approaches. The methods described by Tur et. al. in Active learning for spoken language understanding, In 2003 IEEE International Conference on Acoustics, Speech, and Signal Processing, 2003. Proceedings (ICASSP'03). IEEE, 2003 uses the confidence score of a pretrained classifier to reduce the amount of data to be reviewed by annotators in the labelling phase. This disclosure also uses confidence scores for updating the intents, but it does this during system deployment, not in a post-processing phase, and using an unsupervised approach.

U.S. Patent Publication No. 2004/0111253 uses automatic clustering methods to reduce the amount of information to be reviewed by human annotators. However, it still needs annotators for retraining, therefore it is not an unsupervised method.

Another approach uses the semantic web for unsupervised training of a natural language understanding module. It collects structured data from pages like www.freebase.com. This solution might work well with a generic conversation chatbot, but not with a domain specific customer-oriented chatbot. Customer-oriented chatbots require training with domain knowledge.

Asking for a confirmation from the user when confidence is low is another well-known method for training a dialogue system. This method allows retraining of a classifier that is in use, but it is limited to updating existing intents. It cannot create new intents.

The method proposed in this disclosure allows not only unsupervised updating of existing intents, but, unlike previous methods, it allows the creation of new ones including the modification of the dialogue manager to incorporate these intents and new responses (obtained by automatically guiding human agents), during the conversation with the user.

This section provides background information related to the present disclosure which is not necessarily prior art.

SUMMARY

This section provides a general summary of the disclosure, and is not a comprehensive disclosure of its full scope or all of its features.

Different unsupervised techniques are presented for training a dialogue system. In one aspect, the training technique includes: receiving a first utterance from a user, where the first utterance represents a request from the user; determining a first intent which corresponds to the first utterance, where the first intent has a confidence value and the confidence value indicates the likelihood that the meaning of the first utterance corresponds to the intent; comparing the confidence value for the first intent against a threshold; responding to the user in response to a determination that the confidence value for the first intent is greater than the threshold; prompting, via a dialogue manager, the user to repeat the request in response to a determination that the confidence value for the first intent is below the threshold; receiving a second utterance from the user; determining a second intent which corresponds to the second utterance, where the second intent has a confidence value and the confidence value indicates the likelihood that the meaning of the second utterance corresponds to the intent; comparing the confidence value for the second intent to the threshold; comparing the first intent to the second intent in response to a determination that the confidence value for the second intent exceeds the threshold; and updating a database used by the natural language processor with the first utterance, where the database is updated in response to a determination that the confidence value for the second intent exceeds the threshold and in response to the first intent matching the second intent.

In one embodiment, the first intent is determined by determining one or more intents which correspond to the first utterance, where each of the one or more intents has a confidence value and the confidence value indicates the likelihood that the meaning of the first utterance corresponds to the intent; and identifying the first intent from the one or more intents which correspond to the first utterance, where the first intent has the highest confidence value amongst the one or more intents which correspond to the first utterance.

Similarly, the second intent is determined by identifying one or more intents which correspond to the second utterance, where each of the one or more intents has a confidence value, and the confidence value indicates the likelihood that the meaning of the second utterance corresponds to the intent; and identifying a second intent from the one or more intents which correspond to the second utterance, where the second intent has the highest confidence value amongst the one or more intents which correspond to the second utterance.

The training technique may further include: suggesting a response to the user in response to a determination that the confidence value for the second intent is below the threshold. The response is suggested to the user by computing scores for possible intents, where the score for a given intent is a function of the confidence value associated with the given intent and a probability of appearance for the given intent in the conversation; selecting an intent with the highest score from the possible intents; and formulating a response using the selected intent. When the user accepts the suggested response, the selected intent in the database used by the natural language processor is updated with the first utterance. When the user does not accept the suggested response, the user is transferred to a person by the dialogue manager. The person may be selected from a pool of persons based on the selected intent and the user transferred to the selected person.

In another aspect, the training technique includes: receiving, via a natural language processor, a first utterance from a user, where the first utterance represents a request from the user; determining, via the natural language processor, a first intent which corresponds to the first utterance, where the first intent has a confidence value and the confidence value indicates the likelihood that the meaning of the first utterance corresponds to the intent; comparing, via the natural language processor, the confidence value for the first intent against a threshold; determining, via the natural language processor, a suggested intent based in part of the first utterance, where the determination of the suggested intent is made in response to a determination that the confidence value for the first intent is below the threshold; suggesting, via a dialogue manager, a response to the user, where response is derived from the selected intent and the response suggestion is made in response to a determination that the confidence value for the first intent is below the threshold; receiving, via the dialogue manager, a reply to the response from the user; and updating the suggested intent in a database used by the natural language processor with the first utterance when the user accepts the suggested response. When the user does not accept the suggested response, the user is transferred to a person by the dialogue manager.

In one embodiment, the first intent is determined by identifying one or more intents which correspond to the first utterance using machine learning, where each of the one or more intents has a confidence value, and the confidence value indicates the likelihood that the meaning of the first utterance corresponds to the intent; and identifying the first intent from the one or more intents which correspond to the first utterance, where the first intent has the highest confidence value amongst the one or more intents which correspond to the first utterance.

In some embodiments, a suggested intent is determined by computing scores for possible intents; and selecting an intent with the highest score from the possible intents, where the score for a given intent is a function of the confidence value associated with the given intent and a probability of appearance for the given intent in the conversation.

In other embodiments, the method may further include generating, via the dialogue manager, possible responses for the person using the first utterance and context of the first utterance in a current conversation; and presenting, via the dialogue manager, the possible responses generated to the person. Possible responses may be generated by computing scores for possible intents, where the score for a given intent is a function of the confidence value associated with the given intent and a probability of appearance for the given intent in the conversation.

In more embodiments, the method may include receiving, via the dialogue manager, an input from the person in response to the presentation of the possible responses generated; comparing, via the dialogue manager, the input to the possible responses generated; determining that the input is a selected response from the possible responses generated; identifying an intent associated with the selected response; and updating the identified intent in the database used by the natural language processor with the first utterance.

In yet another aspect, the training technique includes: connecting, via a dialogue manager, a user of the dialogue system to a person; receiving, via a dialogue manager, a first utterance from the user, where the first utterance represents a request from the user; generating, via the dialogue manager, possible responses for the person using the first utterance and context of the first utterance in a current conversation; presenting, via the dialogue manager, the possible responses generated to the person; receiving, via the dialogue manager, a new response from the person, where the new response does not match any one of the possible responses generated; and updating the model used by the dialogue manager with the new response.

The method may further include: computing, via the dialogue manager, a semantic similarity metric between the new response and responses in a model used by the dialogue manager; identifying, via the dialogue manager, a particular response in the model that is most similar to the new response; and updating, via the dialogue manager, the model used by the dialogue manager with the new response when the semantic similarity metric between the new response and the particular response is below a maximum threshold and exceeds a minimum threshold.

The method may also include: determining, by a natural language processor, a first intent which corresponds to the first utterance, where the first intent has a confidence value and the confidence value indicates the likelihood that the meaning of the first utterance corresponds to the intent; comparing, via the natural language processor, the confidence value for the first intent against a threshold; and connecting, via the dialogue manager, the user to a person in response to a determination that the confidence value for the first intent is below the threshold.

In one embodiment, the dialogue manager responds to the user in response to a determination that the confidence value for the first intent exceeds the threshold.

In some embodiments, possible responses are generated by computing scores for possible intents, where the score for a given intent is a function of the confidence value associated with the given intent and a probability of appearance for the given intent in the conversation.

In other embodiments, when the new response matches one of the possible responses generated, the model used by the dialogue manager is updated by the dialogue manager.

Further areas of applicability will become apparent from the description provided herein. The description and specific examples in this summary are intended merely for illustration purposes and are not intended to limit the scope of the present disclosure.

DRAWINGS

The drawings described herein are merely for illustration purposes regarding selected embodiments and do not encompass all possible implementations, nor are they intended to limit the scope of the present disclosure.

Corresponding reference numerals indicate analogous parts throughout the several views of the drawings.

DETAILED DESCRIPTION

Example embodiments will now be described more fully with reference to the accompanying drawings.

Figure 1:
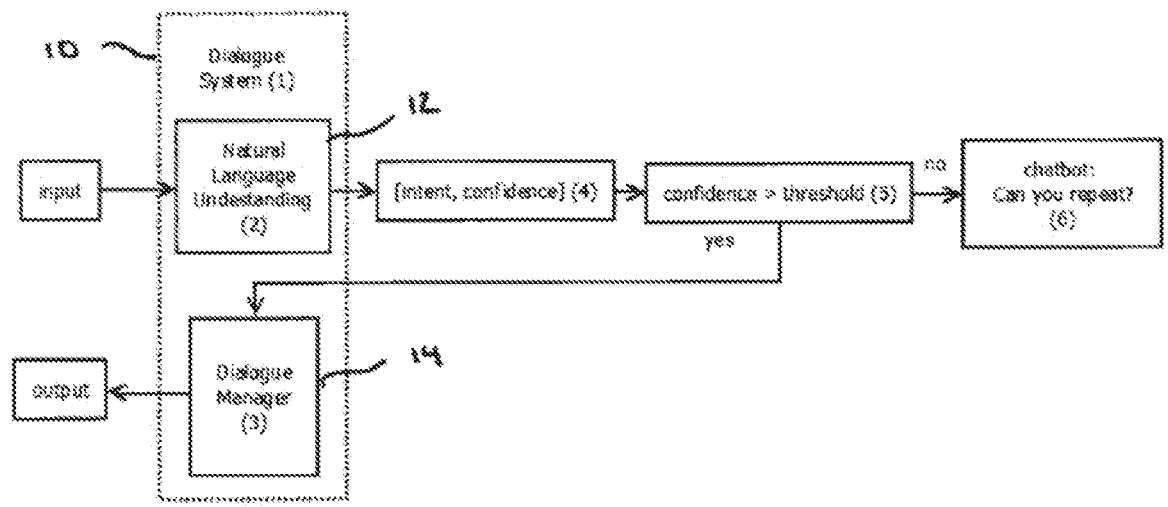
FIG. 1 is a diagram of an example dialogue system.

FIG. 1 depicts an example dialogue system 10. Most automatic dialogue systems 10 can be broken down into at least two modules: a natural language understanding module or natural language processor 12 and a dialogue manager 14 for guiding the conversation.

Figure 2:
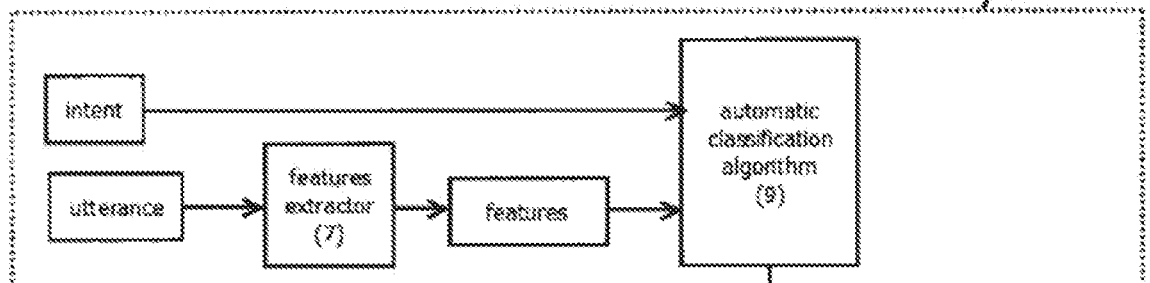
FIG. 2 is a diagram illustrating how a classifier works in a natural language processor.
Figure 2:
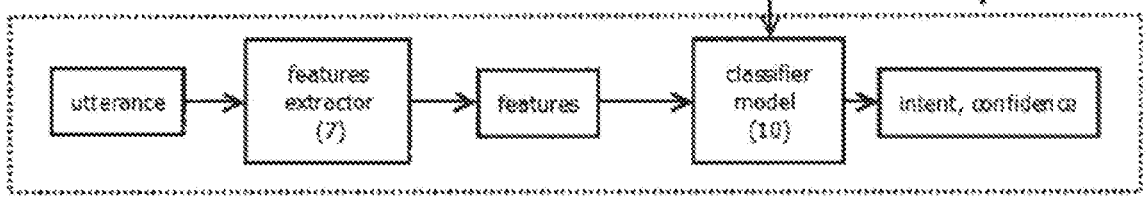

In many dialogue systems, the natural language understanding module (NLU) 12 includes an automatic classifier (FIG. 2). Given a finite set of categories (intents in this case), an automatic classifier resolves the problem of identifying to which category a new observation belongs, based on a large training set of data containing observations whose category is previously known. For this reason, classification is considered a supervised machine learning method.

FIG. 2 shows how a typical classifier works. In this example, the classifier employs two phases: preparation of the model (training) as indicated at 21 and use of the model (labelling) as indicated at 22. Both of these require a feature extractor (FIG. 2, block 7). In one example, the feature extractor is based on an algorithm called Bag of Words (BoW) although other implementations for the feature extractor are also contemplated by this disclosure.

Figure 3:
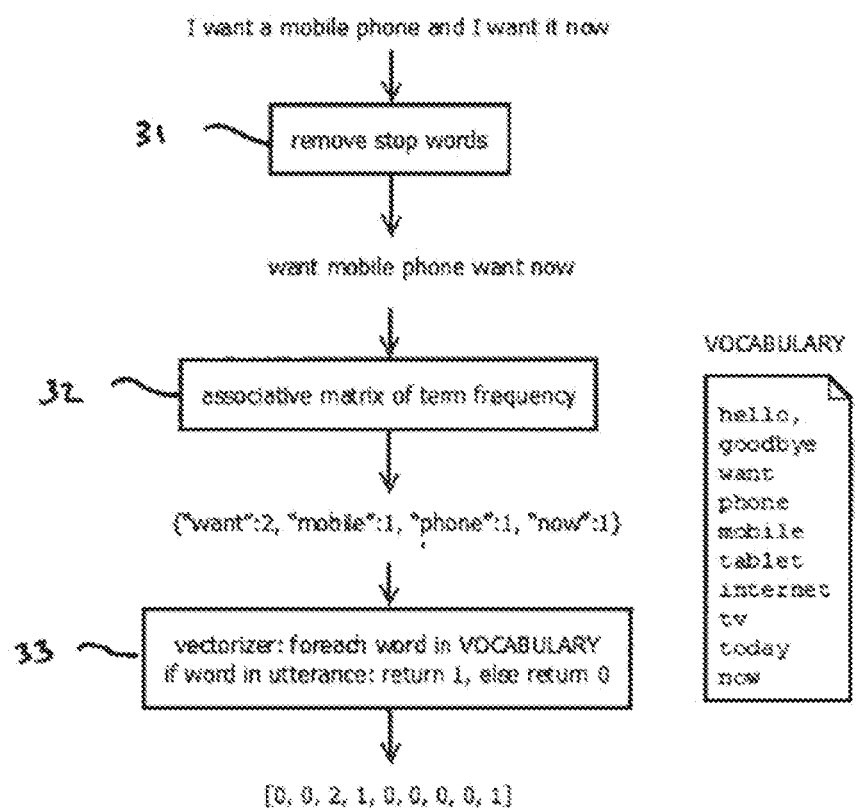
FIG. 3 is flow diagram depicting an example classification process.

For illustration purposes, an example of feature extraction is further described in relation to FIG. 3. In this example, the utterance 'I want a mobile phone and I want it now' can be represented as an associative matrix with the values of the next table.

| word | frequency of appearance |
|---|---|
| Want | 2 |
| Mobile | 1 |
| Phone | 1 |
| Now | 1 |

High-frequency grammar words like "I, a, it, the, of, etc." are first removed at 31. Next, this representation is converted into a numerical vector at steps 32 and 33. Suppose that one defines a vocabulary with only the following ten words: "hello, goodbye, want, phone, mobile, tablet, internet, tv, today, now." In this example, the vectorized representation of the last utterance should be: [0, 0, 2, 1, 1, 0, 0, 0, 1]. The input of the classification algorithm in the labelling phase is many of these vectors associated with an intent label. In this case, the intent could be: 'want_a_mobile'.

In one example, Support Vector Machine algorithms are used to map these vectors as multidimensional points in a space, searching the optimal hyperplane that separates them. Once the model has been trained, one can classify a new utterance (FIG. 2, labelling phase) by calculating in which subspace it falls. In other words, the SVM algorithm predicts the intent of a new utterance, but it can also calculate the distance from this point to the boundary. This value can serve as a confidence index. However, in order to calculate the probability that a given utterance belongs to a certain category, one needs to use a method called Platt scaling, which is described by Niculescu-Mizil et. al. in Predicting good probabilities with supervised learning, In *Proceedings of the 22nd international conference on Machine learning*. ACM (2005), to convert this distance to values between 0 and 1. When the confidence of the best ranked intent exceeds a certain threshold, the system understands the utterance. This threshold can be set empirically depending on the number of different intents of the NLU model. Other types of classification algorithms also fall within the broader aspects of this disclosure.

Figure 4:
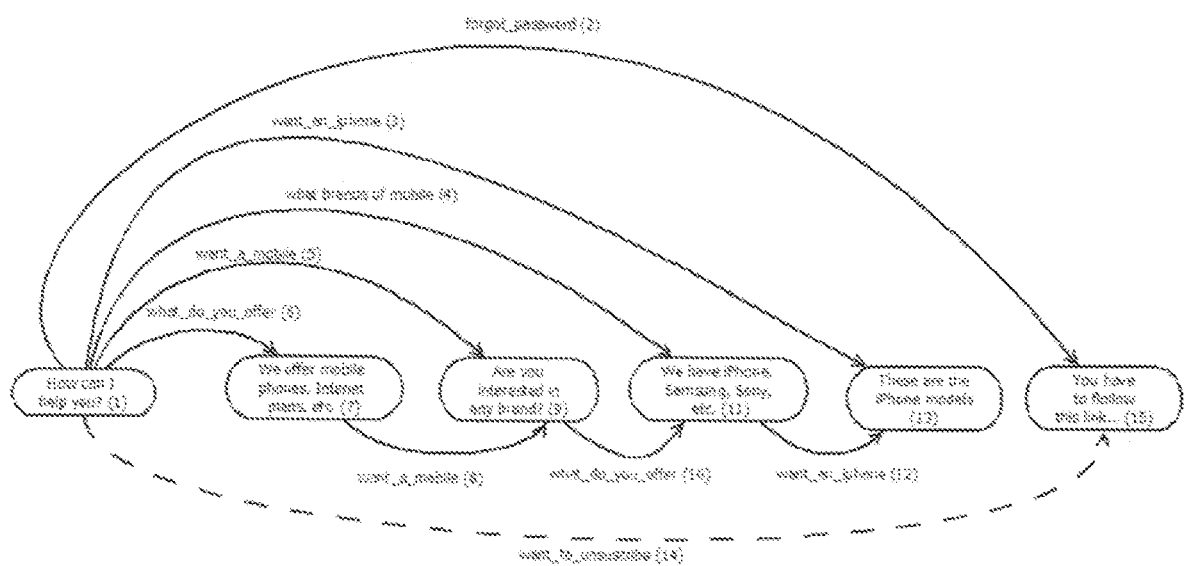
FIG. 4 is a diagram of an example finite state machine.

If the system understands the utterance, an automatic response is selected through the dialogue manager (FIG. 1, Block 3). Depending on the case study, the dialogue manager can be designed in a variety of ways, e.g. based on a finite state machine, using form filling or frames, based on an Information state approach (interpretation of speech in terms of dialogue acts), or via a statistical approach (automatic learning of the sequences of actions). In the example embodiment, a Finite State Machine (FSM) is used as seen in FIG. 4. In this example, the chatbot responses are the states in the FSM and the transitions the intents of the user in the FSM.

On the other hand, if the confidence is below a threshold, then the chatbot normally returns a "non-comprehension" feedback message. For example, the user is asked to repeat his/her request as indicated at block 6 of FIG. 1.

In order to avoid a loop in case of repeated misunderstood utterances, many chatbots allow a transfer mechanism to a human agent (for example, when there are two consecutive sentences not understood). The chatbot model set forth in this disclosure incorporates a mechanism of this type and additionally uses the agent responses to recognize previous or new intents and modify the chatbot in a completely unsupervised way as will be described in greater detail below.

One objective of this disclosure is to use the utterances not understood by the chatbot to enrich both the database used by the natural language processor and the model (e.g. FSM) used by the dialogue manager.

In a simple embodiment, the training database used by the natural language processor may consist of a list of pairs, (utterance, intent) as shown in the following table. Updating this database would mean simply adding an entry to a table.

| Utterance | Intent |
|---|---|
| Hello | Salutation |
| Hi! | Salutation |
| Good morning | Salutation |
| I want a mobile | want_a_mobile |
| I need a new phone | want_a_mobile |
| want a cellphone | want_a_mobile |

When the classifier is trained with new information, the whole model will be more robust and better at understanding new variants.

Figure 5:
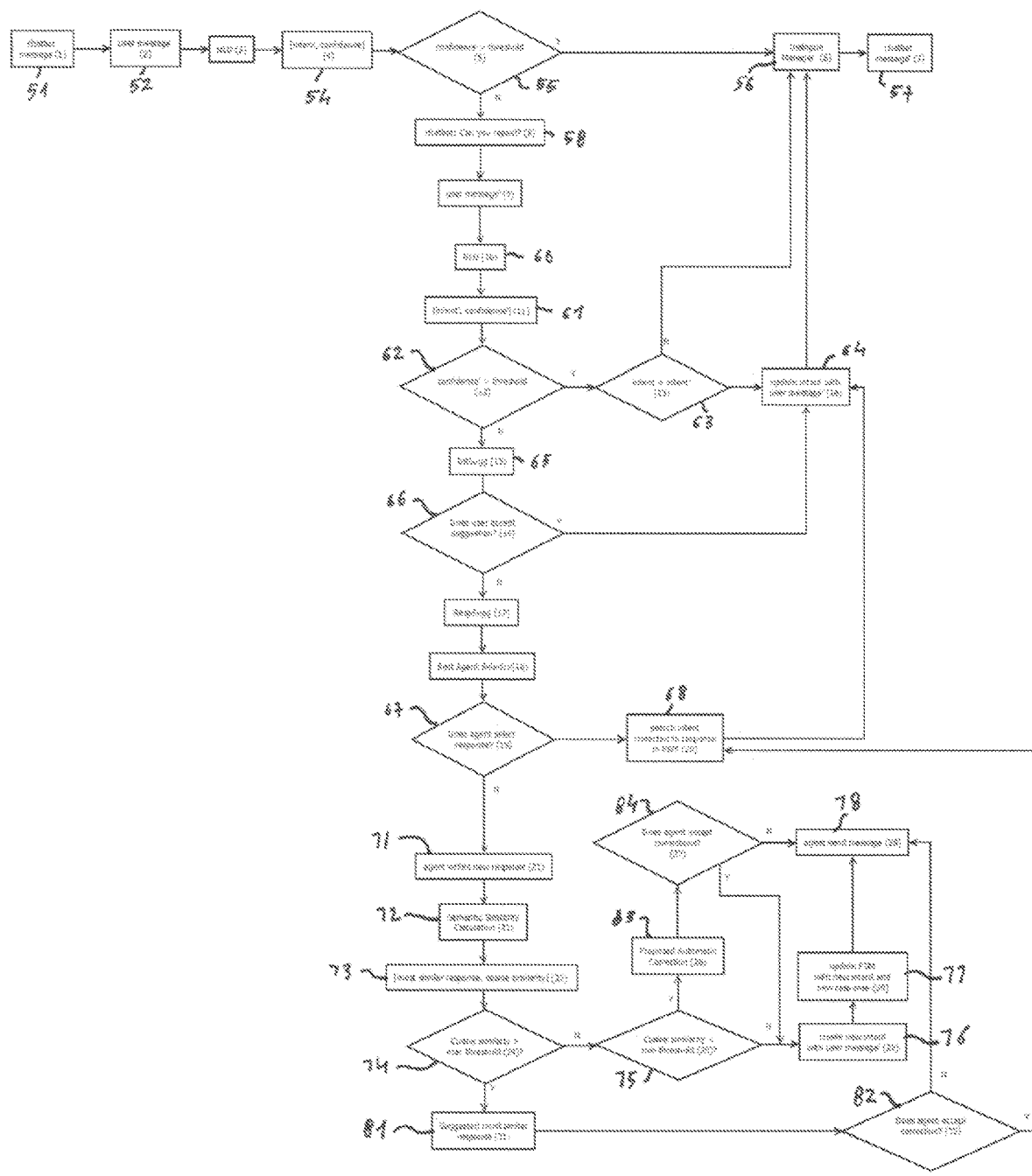
FIG. 5 is a flowchart illustrating an example embodiment of the unsupervised training techniques set forth in this disclosure.

FIG. 5 illustrates an example embodiment of the unsupervised training techniques set forth in this disclosure. In particular, three different techniques are described for adding new examples (utterances) to an existing intent. The number references below are associated with FIG. 5.

First of all, a chatbot message (1) is received at 51. This message could be the first of a conversation or part of a larger conversation. The response (2) to the chatbot message (i.e. first utterance) from the user is sent at 52 to the natural language understanding module. The NLU module in turn produces a list of intents, along with associated confidence scores, as indicated at 54.

The intent from the list of intents with the highest confidence score is compared at 55 against a threshold. If the confidence score of the highest-rated intent is higher than the threshold, the utterance (2) from the user is sent to the dialogue manager 56 which generates a response to the user (7) as indicated at 57. This situation means that the NLU understands the intent expressed in the utterance from the user and this conversation is not used to update the training database.

On the other hand, if the confidence score of the highest rated intent is below the threshold, the chatbot asks the user to repeat the response at 58. In other words, the chatbot asks the user to reformulate his/her request.

The new response (9) from the user (i.e. second utterance) is also sent to the NLU module as indicated at 60. Again, the NLU module produces a list of intents for the new response (9) at 61 and compares the intent with the highest confidence score against the threshold at 62. If the confidence score of the highest-rated intent exceeds the threshold, then the highest-rated intent from 54 is compared with the highest-rated intent from 61 as indicated at 63. If the two intents match, one can assume with sufficient certainty that user messages (2) and (9) are semantically equivalent. In other words, the second utterance from the user (9) could be a corrected version of the first utterance from the user (2). In this case, one can update the intent database for training by adding the first utterance from the user (2) labelled with the intent in (11).

Example: (the following examples assume that the threshold is 0.3)
Chatbot: How can I help you? (1)
User: want a cellphone (2)
{int :want_a_mobile, conf: 0.25} (4)
C: Can you repeat please? (6)
U: I want a mobile please (9)
{int :want_a_mobile, conf: 0.60} (11)
{update intent want_a_mobile with 'want a cellphone'} (14)
C: Are you interested in any brand? (7)

On the other hand, if the intents of (4) and (11) are different (i.e. do not match), the intent (11) is sent to the dialogue manager (6) at 56 and a response (7) is generated at 57. In the latter case, one cannot assume that the user messages (2) and (9) are equivalent. It may be the case that the user does not repeat the message but asks for something different. Consequently, the messages labelled in the example above would not become part of the training database.

Example:
C: How can I help you? (1)
U: want a cellphone (2)
{int :want_a_mobile, conf: 0.25}
C: Can you repeat please? (8)
U: I want to talk with a person (9)
{int :want_to_transfer, conf: 0.80} (11)

In many chatbot services, the second time the NLU module does not understand a user utterance, the conversation is transferred to a human agent.

Before transferring to an agent, if the confidence score of highest-rated intent (11) is below the threshold, a response to the user is automatically suggested at 65 based on the intent that has a high probability of being correct via module (15). The suggestion module (15) combines information from the NLU and from historic logs from previous conversations with other users to find the optimal candidate in a manner further described below. The most probable intent is the one that obtains the highest result after multiplying its confidence with the probability of appearance of the intent that appears after the last response produced by the chatbot. This probability is obtained from a corpus of previous conversations.

In one example, the probability of appearance of an intent at a certain point in the conversation can be calculated dynamically from the analysis of previous conversation logs with other users. This probability is calculated using simple statistics, for example by counting the number of times in history logs that an intent follows a given response. If there are no previous conversations, the probabilities are set to equal probabilities.

Example:
C: How can I help you? (1)
U: want a cellphone (2)
{int :want_a_mobile, conf: 0.25}
C: Can you repeat please? (8)
U: a cellphone please (9)
{int :want_to_transfer, conf: 0.28}
C: Maybe, do you want a mobile? (16)

In this conversation, the last best intent predicted (below the threshold) was 'want_to_transfer', but IntSugg suggestion module (15) uses 'want_a_mobile' to build the suggestion response because this intent receives a higher score.

The following table summarizes the calculations made by the IntSugg module (15) at this point of the conversation.

| INT | CONF | PROB | SCORE |
| --- | --- | --- | --- |
| want_to_transfer | 0.28 | 0.30 | 0.084 |
| want_a_mobile | 0.20 | 0.58 | 0.116 |
| Ask_taxes | 0.13 | 0.10 | 0.013 |
| Salutation | 0.12 | 0.02 | 0.002 |
| Affirmation | 0.11 | 0 | 0 |

In this table, INT stands for a particular intent; CONF means the confidence associated with this intent for (9); and PROB means the probability of appearance of INT after the chatbot message (1) in the log of the chatbot conversations. In the table above, the first row indicates that PROB is 0.30, so only 30 percent of the previous registered intents after the chatbot utterance 'How can I help you?' were 'want_to_transfer'; and SCORE is the product of CONF and PROB.

The IntSugg module (15) then takes the intent with the highest SCORE, in this example the second one in the list (although the first on has higher confidence), and uses it for composing a suggestion response. In this way, one can correct possible errors in the data used to train the NLU with expected information obtained from data derived from real usage of the chatbot.

Then, if user accepts the suggestion (condition 17), the intent in (11) is used to update the NLU training database (14) with user message (9) at 64 and the intent is propagated to the dialogue manager for finding the right answer (6) at 56.

On the other hand, if the user does not accept the suggestion, the conversation is transferred to a human agent, who will try to understand the real intent of the user and send him/her an answer. In some embodiments, the NLU information can be used to redirect this conversation to the most appropriate agent. That is, the agent is selected from a pool of agents based on the selected intent. In many call centers' services, there are agents more specialized in solving certain specific issues. In addition, another way to find out the most appropriated agent can also be calculated using the logs from the conversation.

In the example embodiment, an intermediate module (18) between the machine and the human that can read the information in the IntSugg module (15) is responsible for finding the best agent capable of continuing the conversation. If the probability of the second-best ranked intent is higher than a defined threshold, the intermediate module may find the agent who has resolved the most conversations started with this intent and transfer the conversation to him or her.

At this point, one can still try to predict the intent of the user (9) using the response generated by the human agent.

Example:
C: How can I help you? (1)
U: a phone (2)
C: Can you repeat please? (8)

U: a phone please (9)
C: Maybe, do you want to know our phone number? (16)
U: No (17-No)
C: Wait a minute I will transfer you (18)
C: Are you interested in any brand? (7)

Continuing with this example, suppose that InstSugg information after (9) is as follows:

| INT | CONF | PROB | SCORE |
|---|---|---|---|
| ask_phone_number | 0.28 | 0.30 | 0.084 |
| want_a_mobile | 0.14 | 0.58 | 0.081 |
| Ask_taxes | 0.11 | 0.10 | 0.010 |
| Salutation | 0.10 | 0.02 | 0.002 |
| Affirmation | 0 | 0 | 0 |

After (16), the response suggestion module (17) selects the intents whose probability (PROB) at this point in the conversation is greater than zero and sends them to the dialogue manager to generate these possible responses:

| INT | RESP |
|---|---|
| Ask_phone_number | Our number is 0441 |
| want_a_mobile | Are you interested in any brand? |
| ask_taxes | All our prices include indirect taxes |
| Salutation | Hello, how can I help you? |
| affirmation | Sorry, can you repeat? |

The agent selected by the module (18) can now select one response from the last table if any of them is adequate to respond to (9). In the example above, the selected response was 'Are you interested in any brand?' After the agent selects a response from the list, the system looks for the intent that could have carried this response (20) to update the NLU database. To update the NLU database, the system has to find the transition in the FSM that connects the last automatic response. Referring to FIG. 4, the selected response 'Are you interested in any brand?' (state 9) is connected with 'How can I help you?' (state 1) by the arc labelled with the intent 'want_a_mobile'; so, 'want_a_mobile' is the intent that the system was looking for. In this example, it is assumed that the FSM is built in a suitable manner which does not allow two states to be connected directly by more than one transition. In other words, in FIG. 4, state 1 (How can I help you), should not be connected with 15 (You have to follow this link) by two different intents (2 and 14). If this happens, then it could be impossible to automatically recover the intent, knowing only the last response (state).

The automatic method for updating the FSM with new intents and proposed below prevents agents from producing this configuration. In the last example, the only transition in the FSM of FIG. 4 that connects 'How can I help you' with 'Are you interested in any brand?' is the intent 'want_a_mobile'. Once the user accepts the suggestion at 66, the intent recovered is updated with the user message (14) at 64.

If there is no adequate response in the list, it means that the user's request probably corresponds to a new intent not defined yet, and the system will be able to create a new intent associated with that request (28) and update the NLU database.

But before doing that, the agent has to create a new response (state in the FSM) that will be connected with the previous response by the newly created intent. If the agent does not select any of the possible responses offered by (17), he or she has to manually write a new answer (21) as indicated at 71. This response and the intent associated with (9) could be used to update the model (i.e. FSM) used by the dialogue manager.

However, the manually created response may not always be useful for the dialogue manager. Responses very similar to existing ones are redundant and they do not have to be included. On the other hand, very different responses often contain specific user information that may not be applicable to another user. It would not be appropriate to update the FSM with this information as it would introduce unnecessary noise.

To prevent human agents from introducing in the dialogue manager responses that are very close or very different from those that already exist, the system calculates a semantic similarity between two responses at 72. Automatic methods in linguistics to calculate semantic similarity are based on the concept of co-occurrence. Two words are semantically close if they appear more frequently in the same contexts or documents. For example: "cat" is closer to "dog" than "chat", although it differs more orthographically.

To achieve this, the system first transforms the words of the text to be compared into a vector representation, for example using the GloVealgorithm. A standard pre-trained file of GloVe vectors has more than 1 million unique tokens with 300 dimensions like the following example:

dollars=[0.17336 −0.1091 1.5309 0.12964 0.85039 −0.43068 −0.092161 −0.93305 0.45594 0.65308 −0.60152 −0.22764 . . . ]

Each dimension represents one abstract feature automatically inferred by the Glove algorithm. Its number of dimensions is not related to the size of the vocabulary like in the BoW algorithm. The vocabulary is better represented, the more dimensions there are, however 300 are usually sufficient for a standard system.

Given two vectors like this, the Cosine Similarity is calculated as follows:

$$\text{similarity} = \frac{\sum_{i=1}^{n} A_i B_i}{\sqrt{\sum_{i=1}^{n} A_i^2} \sqrt{\sum_{i=1}^{n} B_i^2}}$$

where $A_i$ and $B_i$ are components of vector A and B respectively. If two words or sentences are semantically very related, the value of the Cosine Similarity approaches one; whereas, if they are very different, this value approaches zero. It is readily understood that other algorithms, like word2vec or fastText, produce comparable results.

Using cosine similarity, the module (22) calculates the similarity between the response (21) and every response (state) in the FSM, and outputs the most similar response at 73, which is the one whose Cosine Similarity is the highest.

Next, the most similar response is checked against two conditions.

First, is the cosine similarity (of the most similar response) higher than a maximum threshold (24), for example 0.9 (in other words, if there exists a very similar response in the FSM)? Second, is the cosine similarity below a minimum threshold (25), for example, 0.2 (in other words if the existing responses in the FSM are very different)? If the response created by the agent (21) does not satisfy these two conditions, it means that it is moderately new, neither overly similar nor overly different and the system can create a new intent (29) with the user message (9) at 76, and update a new state of the FSM with the agent response (30), connected from (1) by the new intent created, as indicated at 77. This new configuration can be uploaded on the fly, so in the next interaction with the chatbot the new response will be available, if necessary, to agents. Therefore, new utterances could increase the examples associated with related intent.

In contrast, if the cosine similarity is higher than the maximum threshold (24), then the system suggests to the agent, before continuing with the process, that there are very similar responses in the system (31) at 81. For example: The user says: I want to pay in euros.
Agent writes: Only payment in dollars is allowed.
The system suggests: There is a very similar response in the system: 'You can only pay in dollars', do you want to say the same thing?

If the agent accepts the suggestion (condition 32), the system returns to (20) to search for the intent that triggers this response and updates it with the utterances. If the agent does not accept the suggestion, the agent's new response is sent to the user at 78 but the FSM is not updated, nor is any intent created.

On the other hand, if the cosine similarity is lower than the minimum threshold (25), the module (26) suggests an alternative version of the agent's new response (21) that satisfies the conditions of similarity as indicated at 83. Different approaches can be used to automatically generate this response version. One of these approaches is to use an automatic summarization method based on Statistical Machine Translation (SMT). Other methods to perform summarization can also be used, such as TextRank, which extract pieces or phrases in the original text that are informatively more important.

Standard SMT software, like Moses, uses a table with phrases in two different languages for training its models. In a similar way, for training an automatic summarization model one needs to provide a table with lot of long texts and its summaries. Open databases formed from news headlines and news can be very useful for this task. Through training, the system can learn which parts of a text are dispensable and which parts are important. By so doing, one can produce a semantically equivalent response, which is shorter and likely more suitable for being introduced into the FSM. The reasoning behind the goal of introducing shorter or synthetic responses is that these responses are more likely to be reused in similar situations. Long responses with a lot of information usually only answer a single question. It does not make sense that they are part of an automatic system that can be used by many users.

In the following example, the system detects that the response provided by the agent is too far from existing ones (it is very long). The module (26) offers an alternative summarized version thereof.

The user says: 'I want to pay in euros.'
The agent writes: 'Oh, I'm sorry, but at the moment what you are asking is not possible, you have to go to your bank and ask to exchange the money for dddollars.'
The system sends the agent a message like this: "This message is very different from the rest of the system. You could you say 'You have to exchange the money for dollars?'"

If the agent says no (condition 27), then the message is finally sent to the user (28) at 78. The FSM is not updated with this information, nor is any intent created.

If the agent agrees with the corrected suggestion, the system creates a new intent at 76 and updates the FSM with this response (30) at 77.

Eventually, responses and intents not used to automatically train the FSM could be saved in a repository to be reviewed by human operators, but in any case, these solutions would not be part of the unsupervised system described here.

In summary, this disclosure implements techniques to update known intents, create new ones, and modify the dialogue manager so that new responses can be provided. Known intents can be updated with non-understood messages in three different ways: 1) user repetition reaches the threshold and the intents are the same; 2) user accepts the intent suggestion from the chatbot; and 3) agent accepts the response suggestion from the chatbot. New intents, on the other hand, can be automatically created and automatically associated with real answers provided by human agents. These two strategies used simultaneously allow unsupervised training of a dialogue system as a whole. The advantages of this procedure are there is no need for human intervention to improve the chatbot (unsupervised training) and the variation introduced in the models comes from real data, not from utterances produced artificially by a human.

The techniques described in this disclosure can be very useful for developing dialogue systems in any (but not limited to) of the following environments. Need for a very fast implementation with scarce human resources or lack of experts who carry out maintenance of the dialogue system. For example, a chatbot on the website of a small business like a law firm. Fields of application in which the content of conversations change very often, like the sales service of a large retailer with periodic changes in the catalogue. Case studies in which, a priori, the flow of conversation is mostly unknown, such as emergency services.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise, as apparent from the above discussion, it is deemed that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, these could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer-readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatus to perform the required method steps. The requisite structure for a variety of these systems will be apparent to those of skill in the art, along with equivalent variations. In addition, the present disclosure is not described with reference to any particular programming language. It is regarded that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. This may also be varied in many ways. Such variations are not to be regarded as a departure from the disclosure, and all such modifications are intended to be included within the scope of the disclosure.

The invention claimed is:

1. An unsupervised method for training a dialogue system, comprising:
receiving, via a natural language processor, a first utterance from a user, where the first utterance represents a request from the user;
determining, by the natural language processor, a first intent which corresponds to the first utterance, where the first intent has a confidence value and the confidence value indicates the likelihood that the meaning of the first utterance corresponds to the intent;
comparing, by the natural language processor, the confidence value for the first intent against a threshold;
responding, via a dialogue manager, to the user in response to a determination that the confidence value for the first intent is greater than the threshold;
prompting, via the dialogue manager, the user to repeat the request in response to a determination that the confidence value for the first intent is lower than the threshold;
receiving, via the natural language processor, a second utterance from the user;
determining, via the natural language processor, a second intent which corresponds to the second utterance, where the second intent has a confidence value and the confidence value indicates the likelihood that the meaning of the second utterance corresponds to the second intent;
comparing, via the natural language processor, the confidence value for the second intent against the threshold;
comparing, via the natural language processor, the first intent against the second intent in response to a determination that the confidence value for the second intent is greater than the threshold; and
updating a database used by the natural language processor with the first utterance, where the database is updated in response to a determination that the confidence value for the second intent is greater than the threshold and in response to the first intent matching the second intent.

2. The method of claim 1 wherein determining a first intent further comprises determining one or more intents which correspond to the first utterance, where each of the one or more intents has a confidence value and the confidence value indicates the likelihood that the meaning of the first utterance corresponds to the intent; and
identifying the first intent from the one or more intents which correspond to the first utterance, where the first intent has highest confidence value amongst the one or more intents which correspond to the first utterance.

3. The method of claim 1 wherein the dialogue manager is implemented by a finite state machine.

4. The method of claim 1 wherein determining a second intent further comprises determining one or more intents which correspond to the second utterance, where each of the one or more intents has a confidence value and the confidence value indicates the likelihood that the meaning of the second utterance corresponds to the intent; and identifying a second intent from the one or more intents which correspond to the second utterance, where the second intent has the highest confidence value amongst the one or more intents which correspond to the second utterance.

5. The method of claim 1 further comprises suggesting a response to the user in response to a determination that the confidence value for the second intent is lower than the threshold.

6. The method of claim 5 wherein suggesting a response to the user further comprises computing scores for possible intents, where the score for a given intent is a function of the confidence value associated with the given intent and a probability of appearance for the given intent in a conversation; selecting an intent with the highest score from the possible intents; and formulating a response using the selected intent.

7. The method of claim 5 further comprises
updating the selected intent in the database used by the natural language processor with the first utterance when the user accepts the suggested response.

8. The method of claim 5 further comprises
transferring, via the dialogue manager, the user to a person when the user does not accept the suggested response.

9. The method of claim 8 further comprises selecting a person from a pool of persons based on the selected intent and transferring the user to the selected person.

10. An unsupervised method for training a dialogue system, comprising:

receiving, via a natural language processor, a first utterance from a user, where the first utterance represents a request from the user;

determining, via the natural language processor, a first intent which corresponds to the first utterance, where the first intent has a confidence value and the confidence value indicates the likelihood that the meaning of the first utterance corresponds to the intent;

comparing, by the natural language processor, the confidence value for the first intent against a threshold;

determining, via the natural language processor, a suggested intent based in part of the first utterance, where the determination of the suggested intent is made upon occurrence of a determination that the confidence value for the first intent is lower than the threshold;

suggesting, via a dialogue manager, a response to the user, where the suggested response is derived from the selected intent and the suggestion of the response is made upon occurrence of a determination that the confidence value for the first intent is lower than the threshold;

receiving, via the dialogue manager, a reply to the response from the user; and updating the suggested intent in a database used by the natural language processor with the first utterance when the user accepts the suggested response.

11. The method of claim 10 wherein determining a first intent further comprises determining one or more intents which correspond to the first utterance using machine learning, where each of the one or more intents has a confidence value and the confidence value indicates the likelihood that the meaning of the first utterance corresponds to the intent; and identifying the first intent from the one or more intents which correspond to the first utterance, where the first intent has highest confidence value amongst the one or more intents which correspond to the first utterance.

12. The method of claim 10 wherein determining a suggested intent further comprises computing scores for possible intents; and selecting an intent with highest score from the possible intents, where the score for a given intent is a function of the confidence value associated with the given intent and a probability of appearance for the given intent in a conversation.

13. The method of claim 10 further comprises transferring, via the dialogue manager, the user to a person when the user does not accept the suggested response.

14. The method of claim 13 further comprises generating, via the dialogue manager, possible responses for the person using the first utterance and context of the first utterance in a current conversation; and presenting to the person, via the dialogue manager, the possible responses generated.

15. The method of claim 14 further comprises generating possible responses by computing scores for possible intents, where the score for a given intent is a function of the confidence value associated with the given intent and a probability of appearance for the given intent in the conversation.

16. The method of claim 14 further comprises receiving, via the dialogue manager, an input from the person in response to the presentation of the possible responses generated;

comparing, via the dialogue manager, the input to the possible responses generated;

determining that the input is a selected response from the possible responses generated;

identifying an intent associated with the selected response; and updating the identified intent in the database used by the natural language processor with the first utterance.

17. An unsupervised method for training a dialogue system, comprising:

connecting, via a dialogue manager, a user of the dialogue system to a person;

receiving, via the dialogue manager, a first utterance from the user, where the first utterance represents a request from the user;

generating, via the dialogue manager, possible responses for the person using the first utterance and context of the first utterance in a current conversation;

presenting, via the dialogue manager, the possible responses generated to the person;

receiving, via the dialogue manager, a new response from the person, where the new response does not match any one of the possible responses generated; and updating a model used by the dialogue manager with the new response.

18. The method of claim 17 further comprises computing, via the dialogue manager, a semantic similarity metric between the new response and responses in the model used by the dialogue manager;

identifying, via the dialogue manager, a particular response in the model that is most similar to the new response; and updating, via the dialogue manager, the model used by the dialogue manager with the new response when the semantic similarity metric between the new response and the particular response is lower than a maximum threshold and greater than a minimum threshold.

19. The method of claim 17 further comprises determining, via a natural language processor, a first intent which corresponds to the first utterance, where the first intent has a confidence value and the confidence value indicates the likelihood that the meaning of the first utterance corresponds to the intent;

comparing, via the natural language processor, the confidence value for the first intent against a threshold; and connecting, via the dialogue manager, the user to a person in response to a determination that the confidence value for the first intent is lower than the threshold.

20. The method of claim 17 further comprises responding, via the dialogue manager, to the user in response to a determination that the confidence value for the first intent is greater than the threshold.

21. The method of claim 17 further comprises generating possible responses by computing scores for possible intents, where the score for a given intent is a function of the confidence value associated with the given intent and a probability of appearance for the given intent in a conversation.

22. The method of claim 17 further comprises updating, via the dialogue manager, the model used by the dialogue manager, where the model is updated when the new response matches one of the possible responses generated.

23. The method of claim 17 wherein the model used by the dialogue manager is further defined as a finite state machine.

* * * * *